Dec. 3, 1946.   C. HOLLERITH   2,411,920
BRAKE STRUCTURE
Filed April 16, 1945
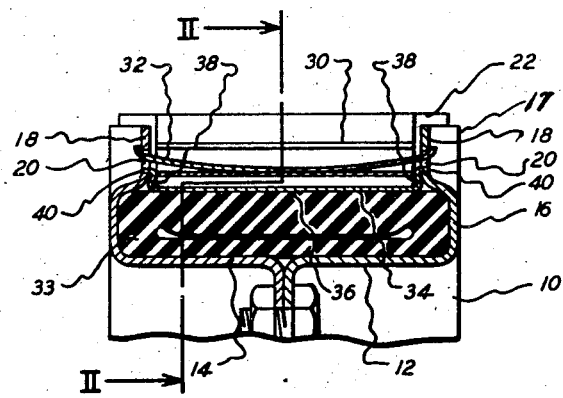
Fig_1_
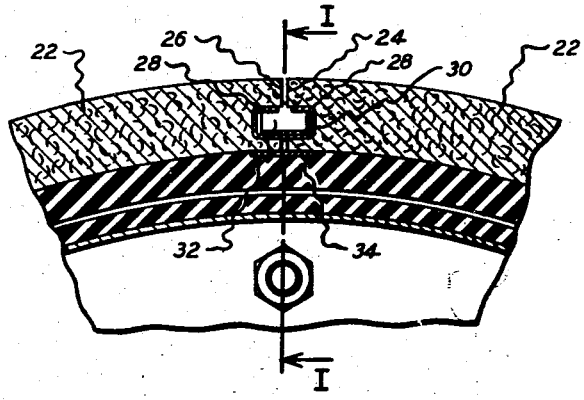
Fig_2_
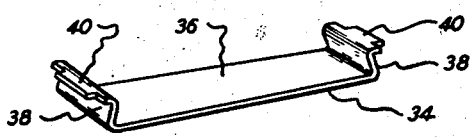
Fig_3_
Inventor
CHARLES HOLLERITH Patented Dec. 3, 1946

2,411,920

UNITED STATES PATENT OFFICE 2,411,920

BRAKE STRUCTURE

Charles Hollerith, Jackson, Mich., assignor, by mesne assignments, to The B. F. Goodrich Company, Akron, Ohio, a corporation of New York Application April 16, 1945, Serial No. 588,439

3 Claims. (Cl. 188—152)

The present invention relates to improvements in expander tube brake construction, and has reference to a brake lining shield and support which functions to protect the expander tube and at the same time support the brake blocks or brake lining in its retracted position.

One of the objects of the present invention is to provide an improved brake lining shield and support of the character described.

Another object of the invention is to provide a novel sheet metal tube shield and lining support for expander tube brakes.

These and other objects and advantages residing in the combination, construction and arrangement of parts will be more fully understood from a consideration of the following specification and claims.

In the drawing, wherein one form of the invention is illustrated,

Fig. 1 is a cross-sectional view taken on line I—I of Fig. II of a brake structure embodying the present invention, Fig. 2 is a cross-sectional view taken on line II—II of Fig. 1, and Fig. 3 is a perspective view of the brake lining shield and support shown removed from the assembly.

The brake structure 10 comprises a pair of complementary sheet metal stampings 12 and 14 which collectively define a channel 17, the sides of which are formed inwardly at circumferentially spaced points to provide thrust shoulders 18. Elongated slots 20 are provided in the shoulders 18.

Sectional arcuate brake blocks 22 have their opposed ends 24 and 26 notched to provide clearance for the shoulders 18, which receive the thrust of the brake blocks 22. Aligned grooves 28 of the opposed ends 24 and 26 of the brake blocks 22 define the transverse opening in which the sheet metal tubular liner 30 is carried. A retractor spring 32 is located within the sheet metal liner 30 and extends through elongated slots 20 of the shoulders 18. For a more detailed description of the brake structure just described, reference may be had to my issued Patent No. 2,350,038, granted May 30, 1944.

To protect the expander tube 33 from injury that might result from extrusion of the same between adjacent ends 24 and 26 of the brake blocks or linings, a sheet metal shield 34 is provided. As more clearly shown in Fig. 3, the shield 34 has a central portion 36, upright portions 38 and flange portions 40. As shown in Fig. 1, the flange portions 40 are snapped into overlapping engagement with the elongated slot 20. In this position the central portion 36 is in overlapping relation with the opposed ends 24 and 26 of adjacent brake blocks 22. Through this arrangement the tube 33 is protected from any injury that might otherwise result due to fluid pressure extruding the tube 33 upwardly between the ends of adjacent brake blocks 22.

In addition to the shielding function of the member 34 with respect to the expander tube 33, it also functions as a support for the brake blocks 22 to limit their radially inward retraction under the action of the springs 32. As it is relatively simple in production to accurately locate the slots 20 and to accurately form the members 34, the result is that the brake blocks 22 may be uniformly supported in their retracted position throughout the entire circumference of the brake structure.

Having thus described my invention, what I desire to cover by Letters Patent and claim is:

1. In a radial brake of the expander tube type, in combination with an expander tube, a channel in which said tube is disposed, opposed openings defined in the sides of said channel arcuate sectional brake blocks circumferentially disposed in end to end relation on said tube and guided for radial movement in said channel, of a shield for said tube and support for said brake blocks comprising a relatively thin member having its ends supported in said openings to bridge said channel, said member overlying said expander tube and being overlapped by opposed ends of adjacent brake blocks, said brake blocks being supported on said member in a retracted position, and means for retracting said brake blocks into engagement with said member.

2. In combination with a radially expandible expander tube brake having a channel in which said tube is located, arcuate sectional brake blocks disposed on said tube and guided within said channel for radial expansion and contraction, adjacent brake blocks being in opposed end to end relation defining an open joint, of a relatively thin transverse shield bridging said channel and disposed between said tube and said open joint to shield said tube from said open joint, means supporting said shield from the sides of said channel in bridging relation therewith, said brake blocks engaging with said shield in their retracted position to limit radial inward movement, and means for retracting said brake blocks against said shield.

3. In combination with a radially expansible expander tube brake having a channel in which said tube is located, arcuate sectional brake blocks disposed on said tube and guided within said channel for radial expansion and contraction, adjacent brake blocks being in opposed end-to-end relation and defining an open joint, of a relatively thin transverse member of channel-shaped construction, said member being disposed between said tube and said open joint to shield said tube from said joint, the opposed ends of said blocks being supported in the channel portion of said member, said member having outwardly extending flanges upon opposite ends thereof, said flanges engaging with the sides of said channel to support said member in bridging relation with said channel, said brake blocks engaging with said member in their retracted position to limit radial inward movement, and means for retracting said brake blocks against said member.

CHARLES HOLLERITH.